Dec. 23, 1952     A. H. SCHUTTE     2,623,010
OIL COKER
Filed Sept. 24, 1949
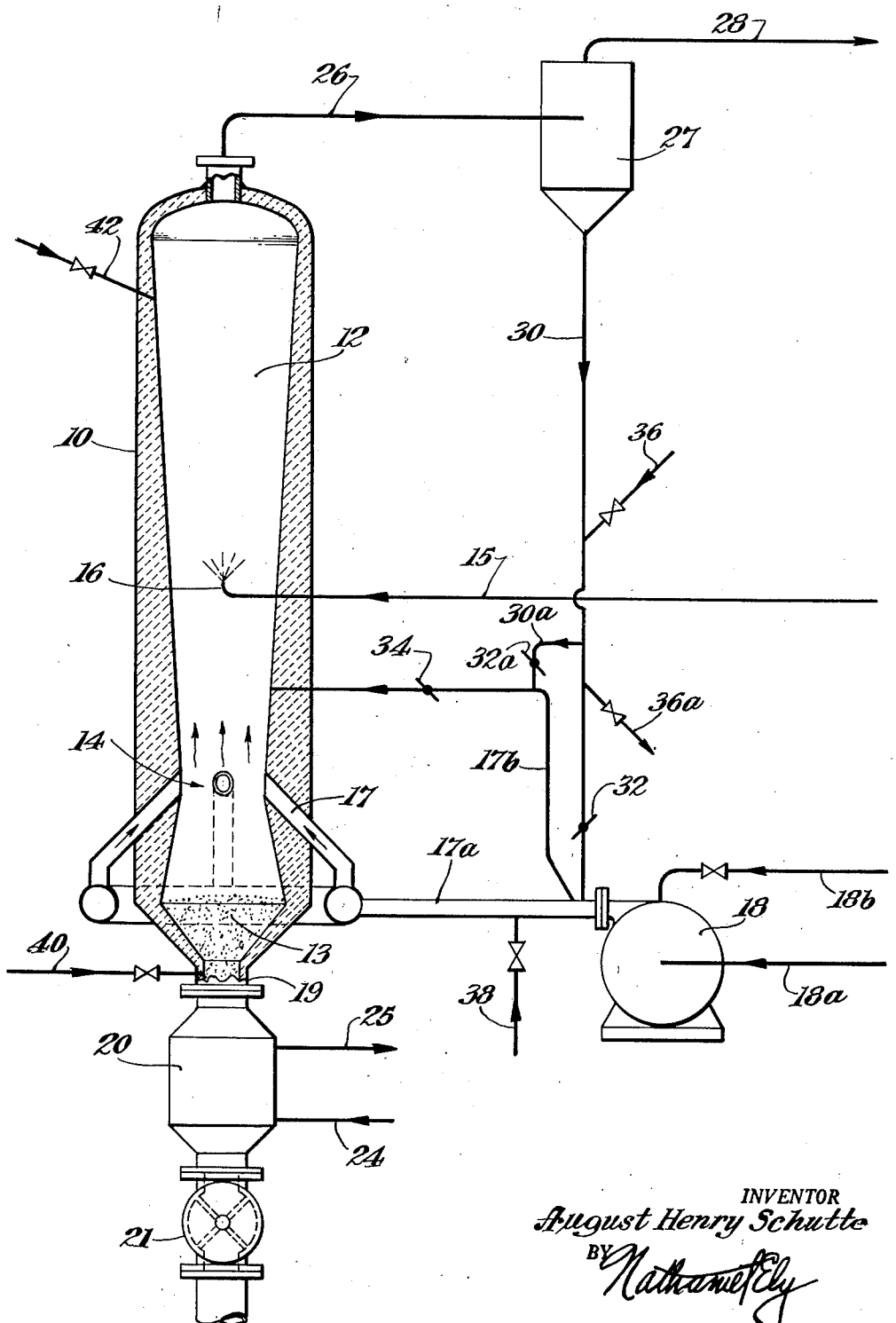
INVENTOR
*August Henry Schutte*
BY *Nathaniel Ely*
ATTORNEY Patented Dec. 23, 1952

2,623,010

UNITED STATES PATENT OFFICE 2,623,010

OIL COKER

August H. Schutte, Hastings-on-Hudson, N. Y., assignor to The Lummus Company, New York, N. Y., a corporation of Delaware Application September 24, 1949, Serial No. 117,595

3 Claims. (Cl. 202—8)

This invention relates to converting hydrocarbons and in particular to the reduction of heavy oils. It is a modification of and improvement on the invention disclosed in my Patent 2,456,796, issued December 21, 1948.

It is a particular object of this invention to provide a new and improved method and apparatus for treating heavy oils such as residues or by-products of petroleum refining, cracking, etc., whereby they are readily and conveniently converted to coke. This is more specifically accomplished by the introduction of the oil into a controlled rising column of combustion gas and other vapors having coke particles suspended therein in disperse phase, the particles being retained and recirculated in the suspension until they grow beyond a predetermined size after which they drop out and may be calcined.

It is a further object of this invention to provide such a method wherein the vapors for the aforesaid coking reaction are formed by the combustion of fuel at the lower part of an upwardly and outwardly extending chamber whereby a predetermined velocity of vapor is obtained with a minimum of air or oxygen to limit the formation of oxygenated products.

These and other objects and advantages of the invention will clearly appear from the following description of a preferred form of embodiment of my invention taken with the attached drawing illustrative thereof, such drawing showing diagrammatically one form of apparatus for achieving the principles of this invention.

The reactor, generally designated 10, is a closed lined vessel provided with a superposed, communicating, upwardly and outwardly extending elutriator section 12 and subjacent coke collection and calcining section 13. The elutriator section 12 communicates with the coke collection chamber 13 through the throat portion 14.

The oil supply conduit 15 communicates with a supply of heavy oils, bottoms, tars, or residues preheated to a suitable temperature, preferably from 800° F. to 900° F. and terminates in a suitable oil inlet 16 disposed in the central portion of the elutriator section 12 above the throat 14. Adjacent the throat 14 is a series of combustion mixture inlets 17, such inlets being supplied by conduit 17a. Blower 18, which has an air or oxygen inlet at 18a and a steam inlet 18b, discharges into the conduit 17a. Fuel gas at 33 is also introduced into conduit 17a to form a desired combustible mixture at the inlets 17.

The lower end of the coke collection and calcining section 13 has a coke outlet 19 which discharges to a coke cooler 20. The production coke is cooled therein to suitable temperatures before it is discharged through feeder 21 to a suitable collection station as, for instance, a product receiver, a briquetting device, or a storage chamber or station. The coke cooler 20 may be adapted for steam generation, the water being introduced at 24 and the steam being withdrawn through the outlet 25, for any desired use.

Leading from the upper end of the elutriator section 12 is the vapor outlet 26 which conveys overhead vapors and coke fines to a separator 27, preferably of the "Cyclone" type, which separates the solids comprising the coke fines from the vapors. The vapors are then passed to a vapor recovery and fractionation unit not shown as by line 28.

The recirculated coke fines drawn off from the lower part of the separator 27 through line 30 are returned to the combustion gas inlet conduit 17a under control of the valve 32. If desired, some of the fines may be by-passed through the line 30a under control of valve 32a into air by-pass line 17b. A coke charge line for starting purposes is shown at 36, and a coke fines drawoff may be provided at 36a for removal of accumulated fines.

In operation, air, fuel gas, and recirculated coke fines are introduced through the inlets 17 into the throat section 14 of the reaction chamber 10. Combustion is obtained in the lower throat section 14 with little or no excess air, and the presence of the coke fines will give a surface combustion effect producing a uniformly luminous mass of burning gas and incandescent particles in the elutriator section 12.

The velocity in the throat section may be independently controlled at any given heat input by varying the steam introduced at 18b.

Above the throat section, in the increasingly larger diameter section 12 of the reactor, a turbulent mass of intermediate sized particles of coke will rapidly absorb the radiant and convection heat from the throat section and produce a uniform temperature throughout the upper section of the reactor. The temperature prevailing in the upper section of the reactor will depend upon the total amount of heat released by combustion and absorbed by reaction rather than on the flame temperature in the actual combustion zone.

The temperature in the combustion zone is preferably in the range of 900° F. to 1200° F. and may be controlled at a level below that dangerous to refractories by introducing steam from line 18b with the air-gas mixture entering at 17, if necessary. At a constant heat input, independent control of the gas velocity at the throat may be obtained by by-passing part of the air-steam mixture through line 17b to a point higher up in the reactor where the cross sectional area is greater.

Preheated oil charge injected into the turbulent mass of particles in the central reactor section at 15 is immediately taken up by the extremely large surface of the suspended particles and thermally converted into gas and vapor products. When the coke particles have grown to sufficient size to overcome the throat velocity, they will drop down into the lower calcining zone 13 where they may be maintained in a dense-phase, turbulent bed condition by introduction of steam or flue gas through line 40 at the bottom of said zone. Sufficient hold-up time for the product coke particles is allowed in the calcining zone so that the particles in their turbulent motion are constantly subjected to radiant heat from the high temperature combustion zone in the throat section. If additional heat is required, a small amount of air may be introduced at the lower part of the calcining zone also through line 40.

The oil charge upon admission is preferably all in liquid condition although there may be as much as 30% of vapors. A portion of the charge is quickly vaporized in the elutriation section 12, while the remainder is released as the heavy tar is coked by the application of sufficient thermal energy to convert it into a dry coating; this is accomplished through the heat from the combustion maintained at the throat 14.

The term "heavy oils" as used herein is to be broadly interpreted as covering hydrocarbons and oils of various specifications which may be converted into coke; the term embraces residues and residuals from topping processes and distillation processes, etc.

The upwardly divergent shape of the reaction chamber 10 establishes a true elutriator effect in section 12. The variation in diameter causing a variation in gas velocity will establish an infinite series of levels of particles of different sizes and although there will be some turbulence due to the constant rise and fall of the particles, there is no opportunity to draw-off other than dry coke. Only the largest particles can pass through the throat, and to reach such size they must have circulated repeatedly through the central part of the elutriator section 12 and developed by slow growth to the pre-determined size.

Some of the fines, due to attrition, or other reasons, may be carried overhead through the vapor outlet 26 and in such case, they can be separated from the vapors in the cyclone separator 27 and returned to the system or drawn-off as previously described. By introducing such fines below the liquid inlet they have a greater opportunity to serve as nuclei for further coke deposited. The net vapor overhead is removed at 28.

In coking a 9° A. P. I. oil charge, supplied at the rate of 6500 bbl./day, the coke production equals approximately 17% of the charge by weight, where the above described apparatus and method are used.

In coking such a charge the conditions are as follows:

Reaction temperature (in 12) _____ 900° F.
Vapor outlet temperature (in 26) . 900° F.
Calcining zone temperature (in 13) _____ 2,200° F.
Requisite minimum velocity (at throat 14) _____ 6½ feet per second.
Oil charge (in 15) at 850° F. liquid air (in 18a) _____ 3000 Standard C. F. M.
Reactor vapors_____ 101,260 lb./hr.
Wt. per cent flue gas in reactor vapors _____ 12.7.

The products obtained from the operation will depend upon the temperature level maintained in the main part of the reactor. For example, at 900° a coking type of operation producing mainly heavy gas oil vapors with a small amount of gasoline and gas may be obtained. If, however, the temperature is raised to 1200° F. to 1400° F. the products will be mainly gas containing a high percent of olefins, including valuable ethylene. The higher temperature operation is, of course, obtained at the expense of greater heat input requirement and a greater content of flue gas in the production vapors. For example, for the above charge, operation at 1400° F. will give reactor vapors containing 53.5 wt. percent flue gas. Processes are now available for separating light olefins from flue gases in an economical fashion.

The principal advantage of this construction over that shown in my prior patent referred to is not only the simplification of the apparatus and elimination of a hot blower, and the simplified control of coking and elutriation, but also the reduction or elimination of oxygenated products in the vapor overhead 28. Furthermore, I am able to produce a calcined coke having less than 0.5 weight per cent volatile matter. By introducing the coal particles at the upper part of the reaction chamber 10, and preferably simultaneously with the introduction of some oil at 16, I can obtain a low temperature coal carbonization with superior yields of products and without causing agglomeration within the chamber.

A modified operation of this apparatus permits the insertion of crushed coal continuously into the system as for example, through the line 42. It is well known that when crushed coal having a range of particles sizes is heated, the fines go to coke first, and then impinge on and adhere to the larger particles while passing through the plastic stage. The main importance of the upwardly flared reaction chamber is of course the provision for a long time vaporizing, coking, and drying period with the infinite number of layers of particles depending upon the size so that only dry particles are drawn off.

From the above description, it will clearly appear that I have provided a new and improved method and apparatus for achieving the above stated objects and advantages as well as other advantages apparent to those skilled in the art.

I claim:

1. The method of continuously coking heavy oil in a vertical reaction chamber having an enlarged bottom coke collection and calcining section, a throat-portion thereabove, and an upwardly and outwardly expanding elutriator section extending above the throat portion, which comprises introducing a mixture of fuel gas and air in combustion proportions with a minimum of excess air into said chamber at the smallest part of the throat portion and burning said fuel gas and air to form an upwardly moving mass of hot combustion gases, introducing particles of said oil into the upper part of said upwardly moving mass in the central portion of the elutriator and maintaining said particles therein for a period sufficient to form coke particles, controlling the velocity of said mass of gases in such a manner that coke particles above a certain size drop out into the bottom coke collection and calcining section, maintaining the coke particles in the last mentioned section in a dense-phase turbulent bed by introducing steam thereinto at the bottom, whereby to subject said collected coke particles to radiant heat from the combustion in the throat portion, withdrawing coke particles as product from the lower part of the coke collection and calcining section, and removing overhead vapors and fines from the upper end of the reaction chamber.

2. The method of claim 1 in which controlling of the velocity of said upwardly moving mass is modified by introducing part of the said air with coke fines into the reaction chamber intermediate the throat portion and the point of oil particle introduction.

3. The method of claim 1 in which air is introduced into the coke collection and calcining section with the steam.

AUGUST H. SCHUTTE.

REFERENCES CITED

The following references are of record in the file of this patent:

UNITED STATES PATENTS

| Number | Name | Date |
|---|---|---|
| 1,027,290 | Smith | May 21, 1912 |
| 1,169,949 | Sziklo | Aug. 2, 1932 |
| 2,323,501 | Tuttle | July 6, 1943 |
| 2,362,270 | Hemminger | Nov. 7, 1944 |
| 2,366,055 | Rollman | Dec. 26, 1944 |
| 2,393,636 | Johnson | Jan. 29, 1946 |
| 2,445,328 | Keith | July 20, 1948 |
| 2,456,796 | Schutte | Dec. 21, 1948 |

FOREIGN PATENTS

| Number | Country | Date |
|---|---|---|
| 585,354 | Great Britain | Feb. 5, 1947 |